(12) United States Patent
Park et al.

(10) Patent No.: US 10,169,473 B2
(45) Date of Patent: Jan. 1, 2019

(54) PACKAGED SEARCHING SYSTEM AND METHOD

(71) Applicant: Hyundai Motor Company, Seoul (KR)

(72) Inventors: Cheol-Woo Park, Seoul (KR); Hong-Hoi Kim, Daejeon (KR)

(73) Assignee: Hyundai Motor Company, Seoul (KR)

( * ) Notice: Subject to any disclaimer, the term of this patent is extended or adjusted under 35 U.S.C. 154(b) by 537 days.

(21) Appl. No.: 14/142,123

(22) Filed: Dec. 27, 2013

(65) Prior Publication Data

US 2015/0081659 A1   Mar. 19, 2015

(30) Foreign Application Priority Data

Sep. 17, 2013   (KR) .................. 10-2013-0111857

(51) Int. Cl.
*G06F 17/30* (2006.01)

(52) U.S. Cl.
CPC .... *G06F 17/3087* (2013.01); *G06F 17/30241* (2013.01); *G06F 17/30554* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 2005/0251331 A1* | 11/2005 | Kreft | G01C 3/08 701/438 |
| 2006/0047649 A1* | 3/2006 | Liang | G06F 17/30864 |
| 2009/0327223 A1* | 12/2009 | Chakrabarti | G06F 17/30864 |
| 2012/0072448 A1* | 3/2012 | Kwon | G06Q 30/02 707/769 |

FOREIGN PATENT DOCUMENTS

| | | |
|---|---|---|
| JP | 2004-355286 A | 12/2004 |
| KR | 10-2006-0134290 | 12/2006 |
| KR | 10-20110103190 | 9/2011 |
| KR | 10-2013-0085011 A | 7/2013 |
| KR | 10-2013-0090375 A | 8/2013 |
| WO | 2009/066393 A1 | 5/2009 |

* cited by examiner

*Primary Examiner* — Aleksandr Kerzhner
*Assistant Examiner* — Giuseppi Giuliani
(74) *Attorney, Agent, or Firm* — Mintz Levin Cohn Ferris Glovsky and Popeo, P.C.; Peter F. Corless

(57) ABSTRACT

A searching system and a searching method are provided and perform packaged searching for information regarding a plurality of objects displayed on a map. As a result, searching may be performed on searching target objects selected by a user, and keywords may be mapped to the selected search target objects to enable packaged searching.

16 Claims, 13 Drawing Sheets

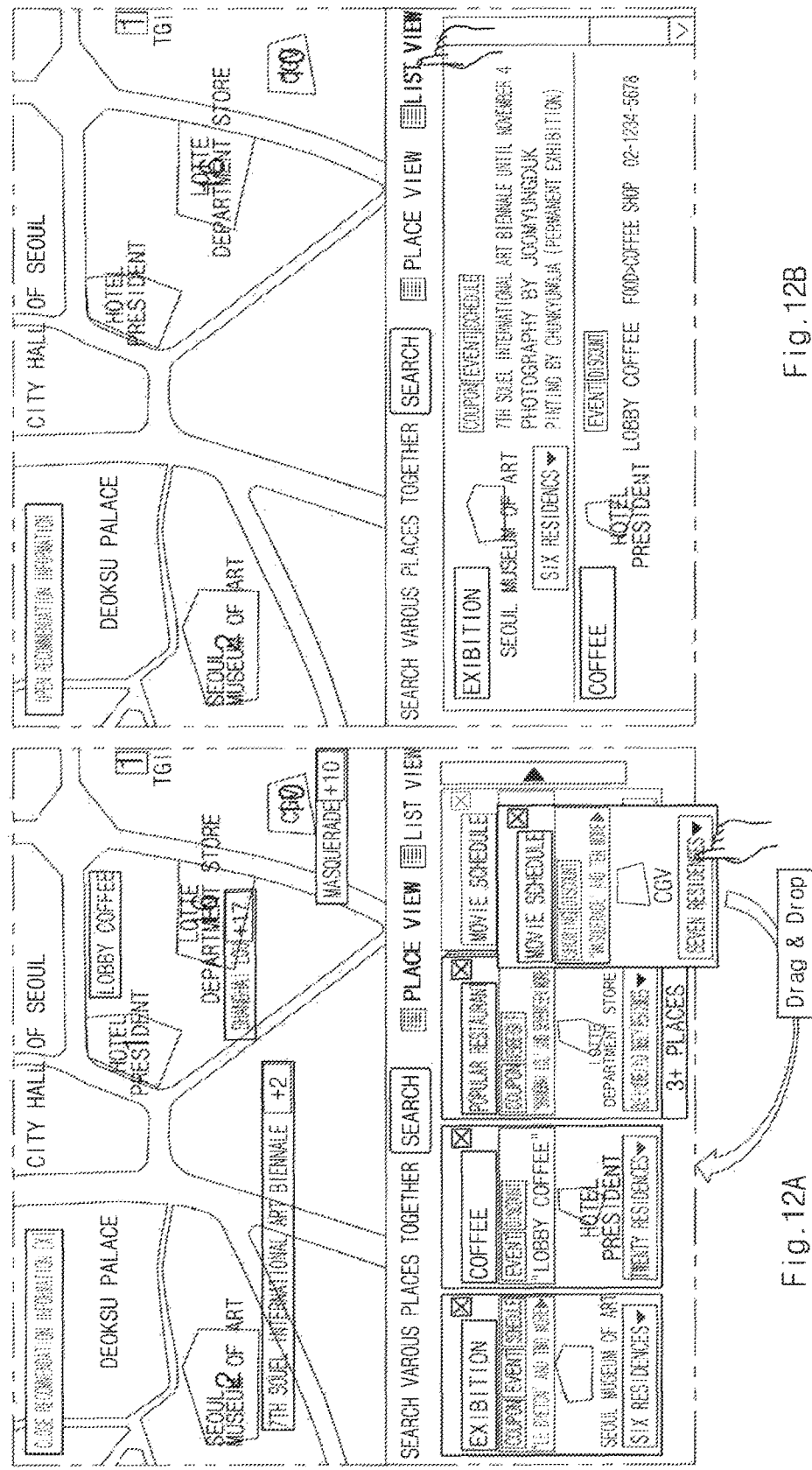

PACKAGED SEARCHING SYSTEM AND METHOD

CROSS-REFERENCE TO RELATED APPLICATION

This application is based on and claims priority from Korean Patent Application No.10-2013-0111657, filed on Sep. 17, 2013 in the Korean Intellectual Property Office, the disclosure of which is incorporated herein in its entirety by reference.

BACKGROUND

Field of the invention

The present invention relates to a searching system and a searching method for objects displayed on a map, and more particularly, to a searching system and a searching method that provide a search box for each object selected on a map and that map a keyword input in the search box to a corresponding object to perform packaged searching on the selected objects.

Description of the Prior Art

In an existing location-based searching method, when a user inputs a desired keyword (e.g., the name of a store) in a search box, all locations matched with the input keyword are found and displayed on a map two-dimensionally. For example, in an existing location-based searching method, when a user inputs "Electro Land game console" in a search box to search a particular space (e.g., building or area) for stores that sell a specific item, in addition to stores that sell game consoles in the "Electro Land," all stores that sell game consoles not located in the "Electro Land" are found and thus, a search that is too wide is performed.

SUMMARY

Accordingly, the present invention provides a searching system and a searching method that perform searching on specific objects on a map selected by a user, and perform packaged searching by mapping the selected objects to keywords to display search result in various manners.

In one aspect of the present invention, a packaged searching system may include a plurality of units executed by a processor. The plurality of units may include: an object display unit configured to display search target objects selected on a map to distinguish the search target objects from objects not selected; a search box creating unit configured to create and display search boxes on the map, each of the search boxes corresponding to the respective search target objects distinguished by the object display unit; an object mapping unit configured to map the search target objects distinguished by the object display unit to the search boxes created by the search box creating unit; a search result producing unit configured to search information on search target objects mapped to the respective search boxes together using search keywords input in the search boxes; and a search result display unit configured to display the information found by the search result producing unit for each search target object.

In another aspect of the present invention, a packaged searching system may include a plurality of units executed by a processor. The plurality of units may include: a search box creating unit configured to create search boxes to define at least one search target object; an object display unit configured to display search target objects moved into the search boxes to distinguish the search target objects from one another; an object mapping unit configured to map the search target objects in the search box to the corresponding search boxes; a search result producing unit configured to search for information on the at least one search target objects in the corresponding search boxes using search keywords input in the search boxes; and a search result display unit configured to display on a screen the information found by the search result producing unit for each search target object.

In yet another aspect of the present invention, a packaged searching method may include: selecting, by a processor, search target objects on a map; creating, by the processor, a search box for each selected search target object to display the search box on the map; performing, by the processor, packaged searching for information on the search target objects using a search keyword input in the search box; and displaying, by the processor, information found for each selected search target on the map.

In still another aspect of the present invention, a packaged searching method may include: creating, by a processor, search boxes to define search target objects; defining, by the processor, search target objects by selecting objects on a map to move the selected objects to the search boxes; searching, by the processor, for the information on the defined search target objects with search keywords input in the search boxes; and displaying the found information.

BRIEF DESCRIPTION OF THE DRAWINGS

The above and other objects, features and advantages of the present invention will be more apparent from the following detailed description taken in conjunction with the accompanying drawings, in which:

FIGS. 9A to 13B are exemplary views illustrating a packaged searching method according to another exemplary embodiment of the present invention.

DETAILED DESCRIPTION

Figure 1:
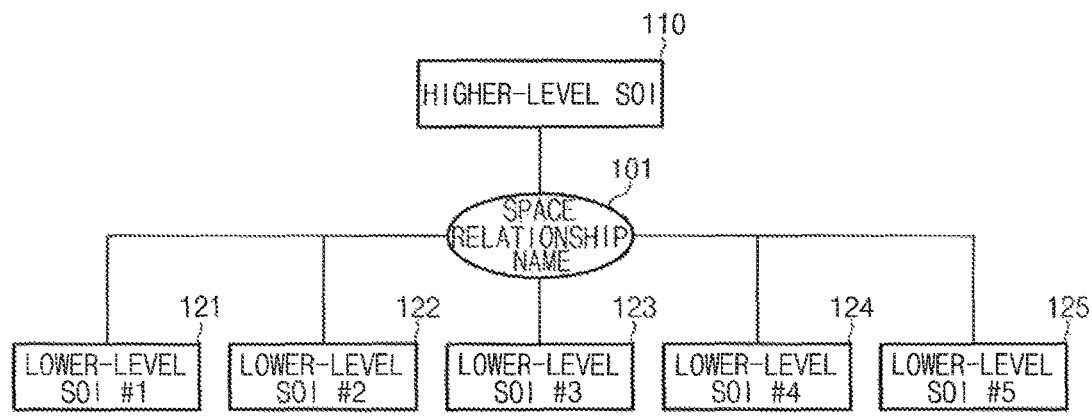
FIGS. 1 to 3 are exemplary views illustrating the structures of space of interest (SOI) objects applied to a searching system according to an exemplary embodiment of the present invention.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings. It is to be noted that in adding reference numerals to elements of each drawing, like reference numerals refer to like elements even though like elements are shown in different drawings. Further, in the following description, well-known functions or constructions will not be described so as not to unnecessarily complicate the disclosure of the principal subject matter of the present invention. It is noted that although exemplary embodiments will be described with respect to SOI (space of interest) objects, the present invention is not limited to SOI objects.

Figure 2:
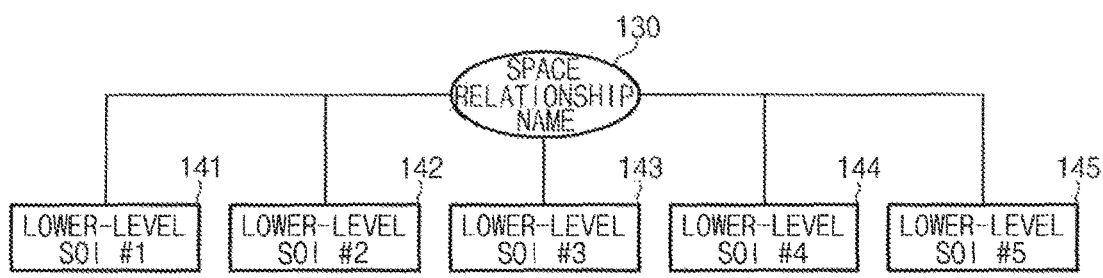
Figure 3:
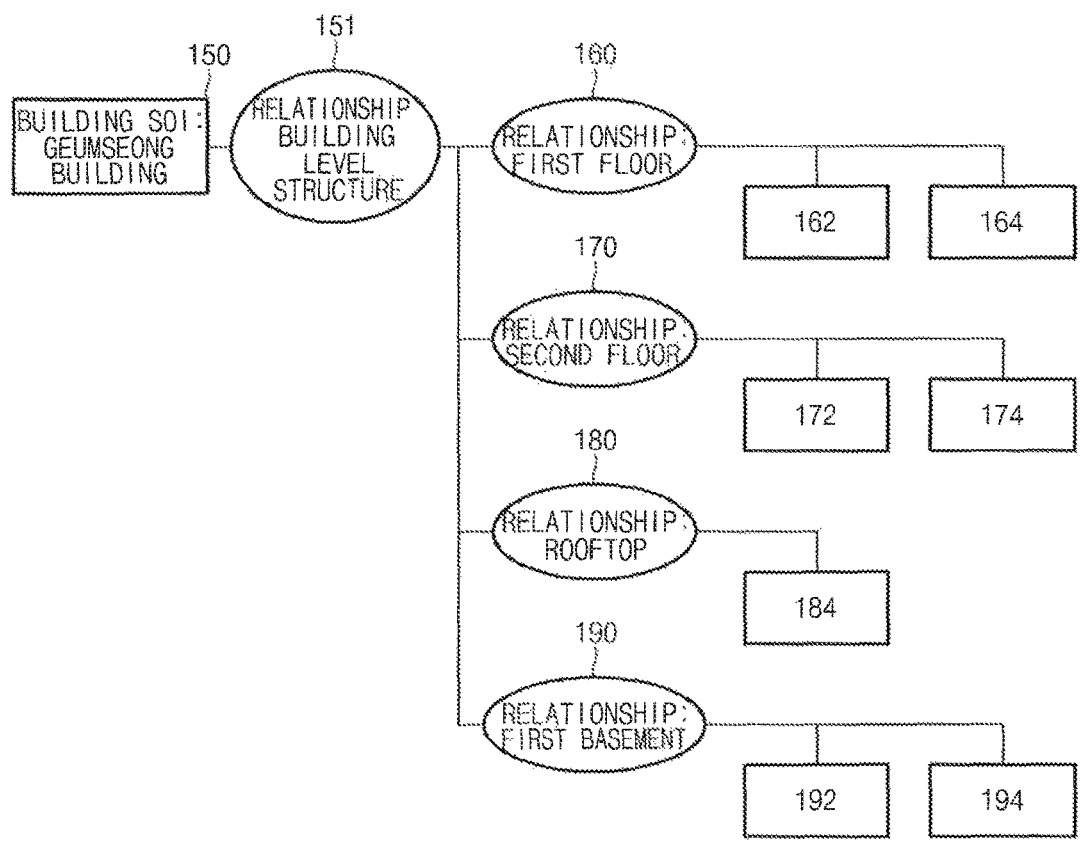

FIGS. 1 to 3 are exemplary views illustrating the structures of SOI objects applied to a searching system according to an exemplary embodiment of the present invention. FIG. 1 illustrates a hierarchical structure of SOI objects. The hierarchical structure may include a higher-level SOI object 110 (e.g., a first level SOT object) and a plurality of lower-level SOI objects 121, 122, 123, 124 and 125 (e.g., a plurality of second level SOI objects) based on the higher-level SOI object 110. The higher-level SOI object 110 and the lower-level SOI objects 121, 122, 123, 124 and 125 may be connected by a first relationship object represented by a space relationship name 101. The space relationship name may define the relationship between the higher-level SOT object and the lower-level SOI objects and may be included in the first relationship object. For example, the higher-level SOI object 110 may be a particular area (e.g., region) on a map while the lower-level SOI objects 121, 122, 123, 124 and 125 may be buildings within the particular area. Additionally, the higher-level SOI object 110 may be a particular building while the lower-level SOI objects 121, 122, 123, 124 and 125 may be stores located in the building. In other words, a lower-level SOI may be defined as an object (e.g., location) within a higher-level SOI and the higher-level SOI may be defined as an object on a map. The lower-level SOI is a narrower view of the higher-level SOI. The SOI objects may be defined as locations.

When a user selects the first relationship object or the higher-level SOI object 110, all of the SOI objects included in the hierarchical structure may be selected. In other words, when the higher-level SOI is selected, the lower-level SOT are automatically selected. When the lower-level SOI objects 121, 122, 123, 124 and 125 include other lower-level SOI objects (e.g., secondary lower-level SOI, not shown) based on themselves, all of the SOI objects selected upon the selection of the first relationship object or the higher-level SOI object 110 may not include the secondary lower-level SOI objects indirectly connected thereto. Alternatively, the lower-level SOI objects may be selected individually by selecting a structure line connected between the lower-level SOI objects or between each of the lower-level SOI objects and the space relationship name 101.

FIG. 2 illustrates an exemplary horizontal structure of SOI objects. The horizontal structure may include a plurality of SOI objects 141, 142, 143, 144 and 145 connected to one another horizontally. The SOI objects 141, 142, 143, 14-4 and 145 may be created as independent SOIs, and may be connected by a second relationship object represented by space relationship name 130 that defines the horizontal structure. The space relationship name 130 may define a common relationship between the SOI objects and may select all of the SOI objects in the horizontal stricture when the space relationship name 130 is selected. In addition, by selecting a structure line connected between the SOI objects or between the SOI objects and the space relationship name 130, the SOI objects in the horizontal structure may be selected individually, and a plurality of SOI objects may be selected simultaneously.

FIG. 3 illustrates an exemplary level structure of SOI objects. The level structure may define the structure of floors of a building and may include one SOI object 150 and a plurality of SOI objects 162, 164, 172, 174, 182, 192 and 194 representing layers in the SOI object 150. The level structure may be represented by a building level structure relationship 151. Further, the building level structure relationship 151 may include relationships 160, 170, 180 and 190 that represent the different floors of the building. Each of the relationships 160, 170, 180 and 190 that represents the floors may be connected to SOIs 102 and 104 associated with stores or accessory structures (e.g., a boiler room or a storage) on the respective floor. In this exemplary embodiment, SOI objects 102 and 104 on each of the layers may be connected in the horizontal structure.

Figure 4:
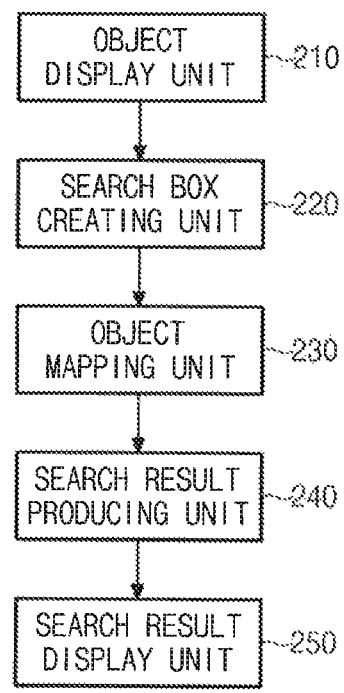
FIG. 4 is an exemplary block diagram illustrating a packaged searching system according to an exemplary embodiment of the present invention.

FIG. 4 is an exemplary block diagram illustrating a packed searching system according to an exemplary embodiment of the present invention. The packaged searching system according to the exemplary embodiment of the present invention may include a plurality of units executed by a processor. The plurality of units may include an object display unit 210, a search box creating unit 220, an object mapping unit 230, a search result producing unit 240, and a search result display unit 250.

The object display unit 210 may be configured to display SOI object on a screen to distinguish the SOI objects selected by a user and the SOI objects not selected by the user. For example, when a user selects an SOI object (e.g., clicks, double-clicks or presses and holds on the SOI object) to search a map for that SOI object, the object display unit 210 may be configured to detect the selection to calculate and extract coordinates of the mouse or touch to recognize which SOI object is selected and may be configured to change the color or shape of the selected SOI object. By changing the colors or shapes of the selected SOI objects, a user may visually recognize the SOI objects that has been selected. Once an SOI object is selected, the object display unit 210 may be configured to create an object selection signal and output the signal to the search box creating unit 220. The object selection signal may include location (e.g., coordinate) information of the selected SOI objects. Further, the object display unit 210 may be configured to display sonic of the selected SOI objects that the user checks advanced search results with different colors or shapes to distinguish the SOI objects from the others.

The search box creating unit 220, upon receiving the object selection signal from the object display unit 210, may be configured to create search boxes for each selected SOI objects to display the objects on the, map. Further, the search box creating unit 220 may be configured to transmit information on which search box corresponds to which SOI object to the object mapping unit 230. The search boxes may be keyword input boxes in which search keywords may be input and may overlap the corresponding SOI objects on a map. The search box creating unit 220 may be configured to create a search box in a separate layer from the layer when map information is displayed, and a user may move the location of the search box using a tab index for the search box in the layer, in other words, the search box creating unit 220 may be configured to create a search box layer to display a search box and then may display the search box on the layer where a map is displayed allowing a user may to move the location of the search box.

The object mapping unit 230 may be configured to map the selected SOI object to a corresponding search box (e.g., search box object) to store the selected SOI object. By defining the relationship between the selected SOI object and the corresponding search box, mapping information may be stored even when a map is moved or a map level is changed. The method of mapping the selected SOI object to the corresponding search box may include: assigning, by a processor, a value of a search box to the member variable of the SOI object to store the SOI object in advance, invoking, by the processor, a method between the SOI object or search box (e.g., control process callback function which is one of functions of Java script) to exchange values, and including, by the processor, the SOI object and search box in different layers and then invoking interface provided between layers to map the layers.

When a keyword is input in the search box and a search button is pressed, the search result producing unit 240 may be configured to search an SOI database (not shown) for information (e.g., information regarding the space and information regarding content related to the space) regarding the SOI object mapped to the search box, to find information related to the keyword. When the selected SOI object includes lower-level SOI objects, the search result calculating unit 240 may be configured to search for the lower-level SOI objects as well. The search result calculating unit 240 may be configured to search for all of the lower-level SOI objects or may search for some of the lower-level SOI objects selected by a user. When a plurality of SOI objects are selected and search keywords are input in substantially all of the search boxes, the search result calculating unit 240 may be configured to perform packaged search for the selected SOI objects. The packaged search may be activated, for example, by selecting search boxes to be searched for together and then pressing (e.g., engaging) a search button, with the control key on a key board engaged. In packaged searching, the search result calculating unit 240 may be configured to search the information regarding the selected SOI objects for related information (e.g., promotion information).

The search result output unit 250 may be configured to display on a screen the search results by the search result calculating unit 240 for each of the SOI objects. For example, the search result output unit 250 may be configured to display the search result near (e.g., substantially next to, or on) a corresponding SOI object on a map. In displaying search results, the search result display unit 250 may be configured to display information related to a search keyword and may display an advanced search result when a user clicks on a symbol (e.g., "+") displayed on a search result display box. Further, in packaged searching for a plurality of SOI objects, the search result output unit 250 may be configured to display related information between the SOI objects, if any, on the search result display box together.

Figure 5:
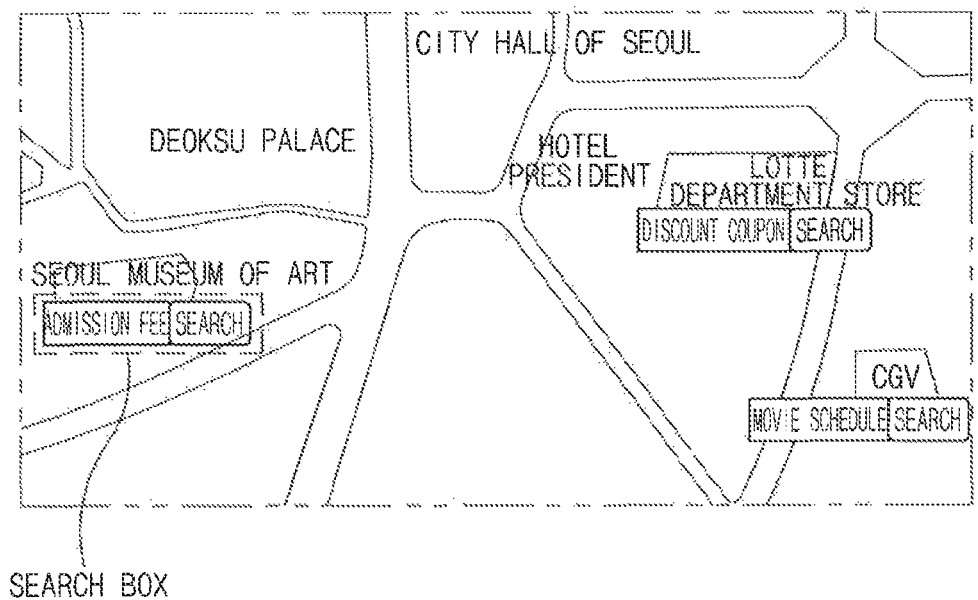
FIGS. 5 to 7 are exemplary views illustrating a packaged searching method according to an exemplary embodiment of the present invention.
Figure 6:
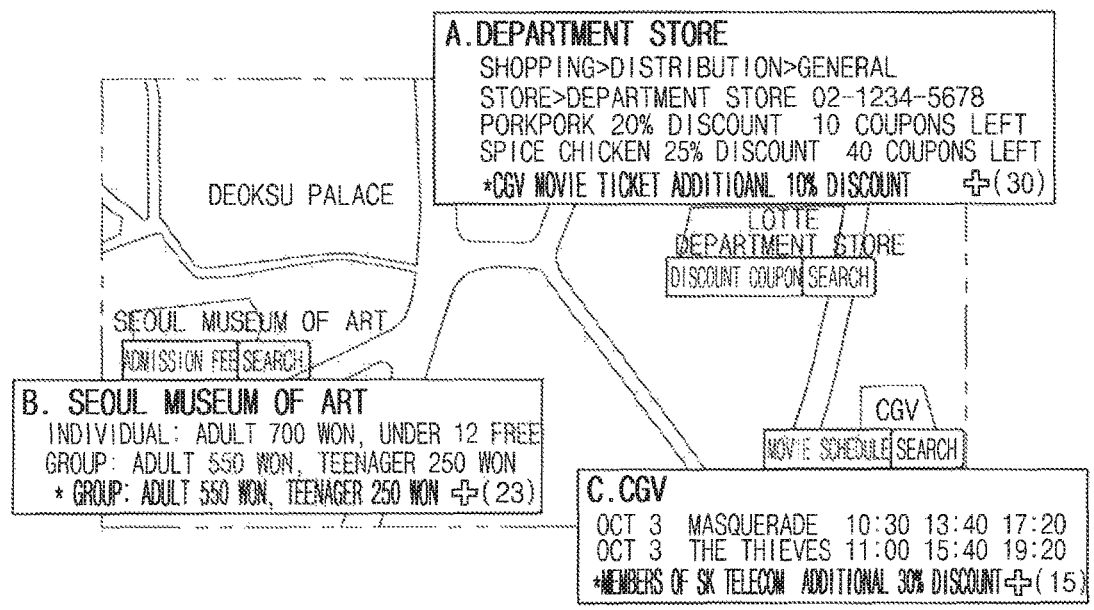
Figure 7:
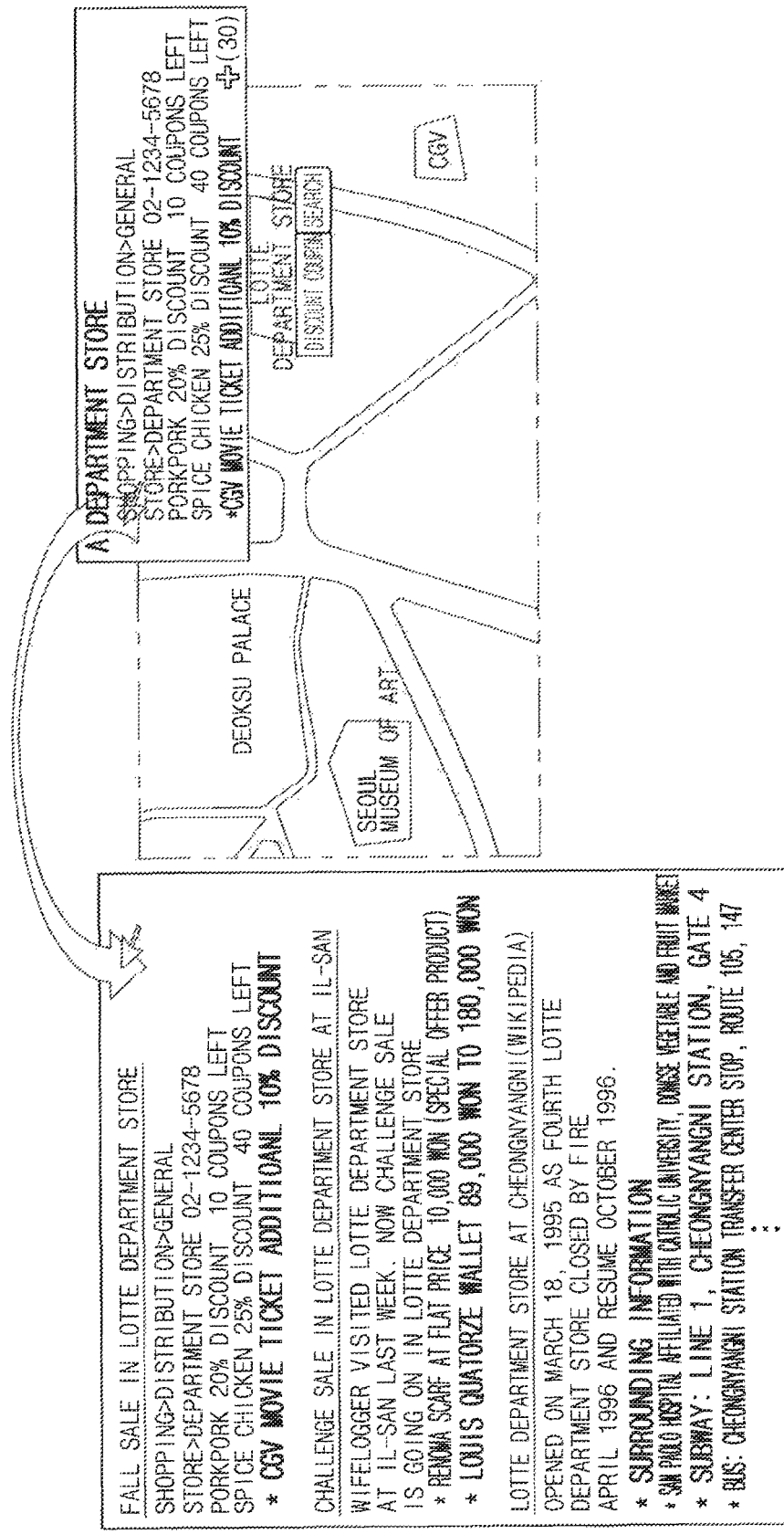

FIGS. 5 to 7 are exemplary views illustrating a packaged searching method according to an embodiment of the present invention. Detailed, description on the searching method according to the embodiment will be made with reference to FIGS. 5 to 7. When a user selects (e.g., clicks on, double-clicks on or presses and holds) SOI objects to search for on a SOI map that provides space object information, the object display unit 210 may be configured to detect the selection to calculate and extract coordinates of the mouse (e.g., the location of the click or selection) to recognize which SOI objects are selected and may be configured to change the colors of the selected SOI objects on the map.

FIG. 5 illustrates an example in which the Seoul museum of Art, the Lotte Department, and the CGV air selected and changed to a red color. Then, the object display unit 210 may be configured to create an object selection signal that includes the coordinates of the selected SOI objects to transmit the coordinates to the search box creating unit 220. Accordingly, the search box creating unit 220 may be configured to create search boxes for each selected SOI object to display the objects on the map. In the exemplary embodiment, the search box creating unit 220 may be configured to create a keyword input box and a search button as a search box and the created search box may be displayed near a corresponding SOI object, for example, on the corresponding SOI object, on the map.

Upon a search box being created, the object mapping unit 230 may be configured to map a SOI object to a corresponding search box. The mapping may be performed by considering a search box as an object and assigning a value of a search box object to a member variable of an SOI object to cause the search box object to depend on the SOI object. Alternatively, the mapping may be performed by invoking (e.g., performing, calling, enabling) a method between an SOI object and a search box object to transmit identifier information. For example, once a search box object is created, the SOI object may transmit SOI identification (ID) information to the search box object to be stored by the search box object. By storing the SOI ID information, it may be possible to identify, with a search keyword input later in the search box, which SOI object is to be searched for. Alternatively, when the SOI objects and search box objects are configured as layers, an interface provided between layers may be used to transmit identifier information.

Furthermore, when a user inputs a desired search keyword (e.g., an admission fee, a discount coupon, a movie schedule, etc.) in a keyword input box of a search box, the search box object may be configured to transmit the input search keyword and identification information on the SOI object mapped to the identification information to the search result calculating unit 240. Accordingly, the search result calculating unit 240 may be configured to search a SOI database (not shown) for information regarding the SOI object (e.g., information on the space and information on content related to the space), to find information related to the input search keywords. For example, information regarding admission fees may be searched for together with the Seoul Museum of Art, information regarding discount coupons may be searched for together with the Lotte Department store, and information regarding a movie schedule may be searched for together with the CGV. The search result may be provided to the search result output unit 250. When the selected SOI objects have lower-level SOI objects, the search result calculating unit 240 may be configured to search for the lower-level SOI objects as well. Further, the search result calculating unit 240 may also be configured to search for related information (e.g., promotion information) between the selected SOI objects.

After searching is completed, the search result output unit 250 may be configured to display part of the information directly related to the search keywords near the corresponding SOI objects on the map, as illustrated in FIG. 6. Additionally, the search result output unit 250 may be configured to display related information from the found SOI objects, if any, on the search result display box together. When other information items are not displayed on the search result display box, the search result output unit 250 may be configured to display a symbol (e.g., a "+" symbol as shown in the example of FIG. 6) to notify that, for example, in the lower-right hand of the search result display boxes. In other words, the numerals next to the symbols "+" may indicate the numbers of hidden search results. When a user clicks on the symbol "+" or drags a search result box and drops in an advanced search result box, the search result output unit 250 may be configured to display all search results on the advanced search result box, as shown in FIG. 7. Although the advanced search result box may be displayed on the left side of the map in FIG. 7, the location of the advanced search result box is not specifically limited.

Figure 8:
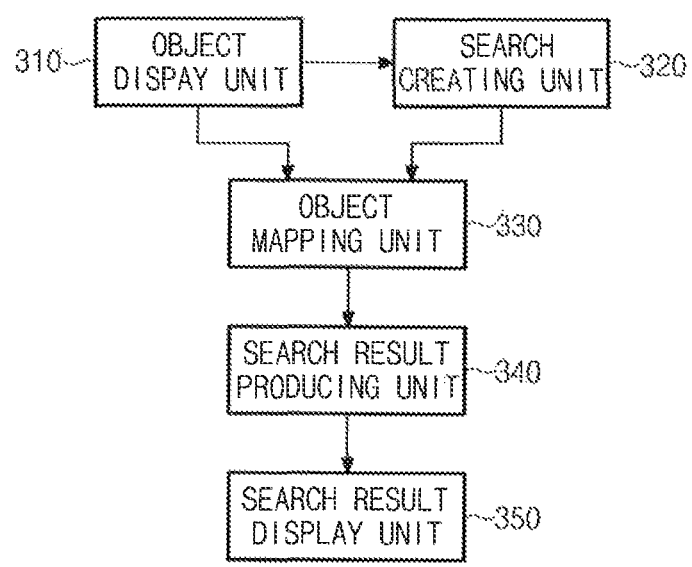
FIG. 8 is and exemplary block diagram illustrating a packaged searching system according to another exemplary embodiment of the present invention.
Figure 9:
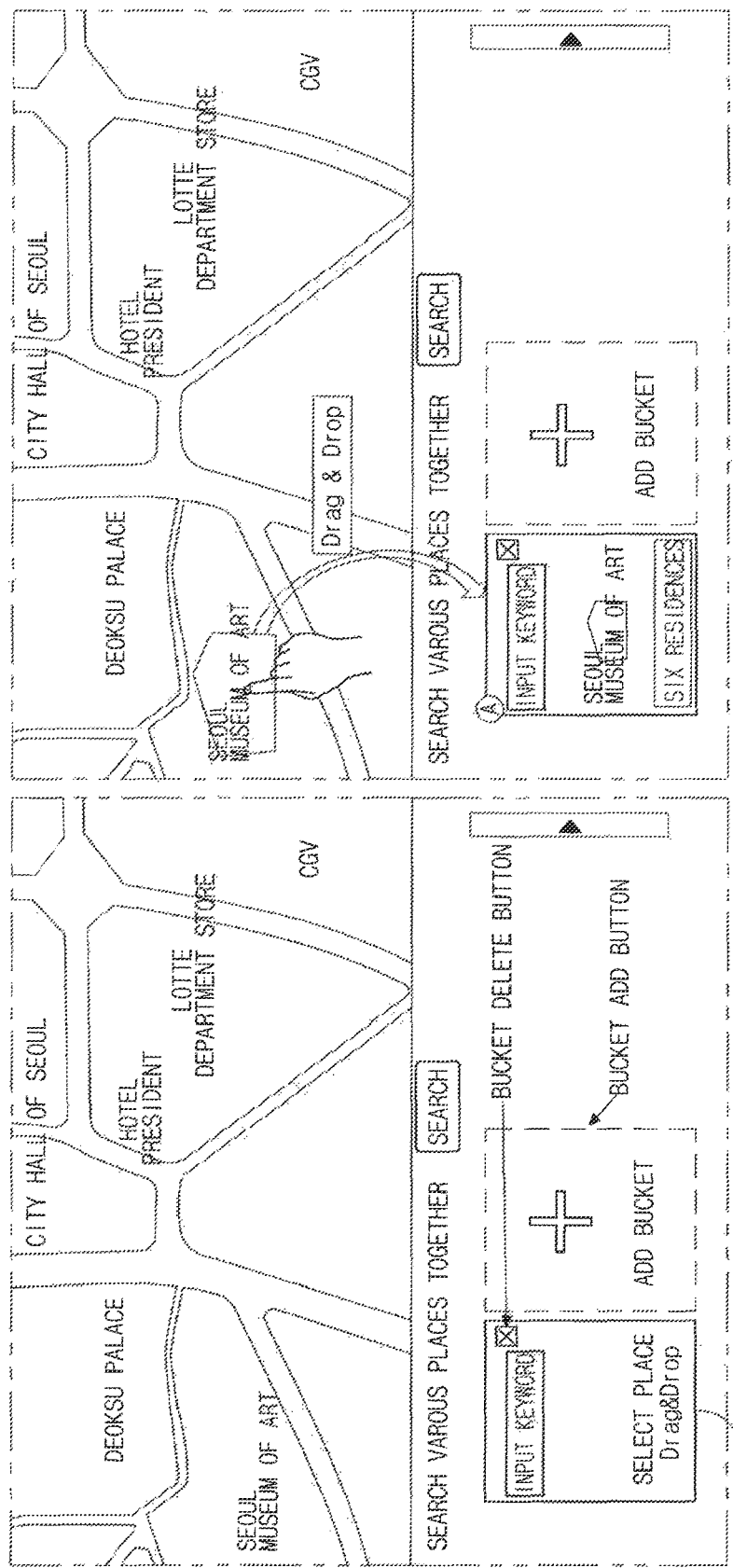
Figure 10:
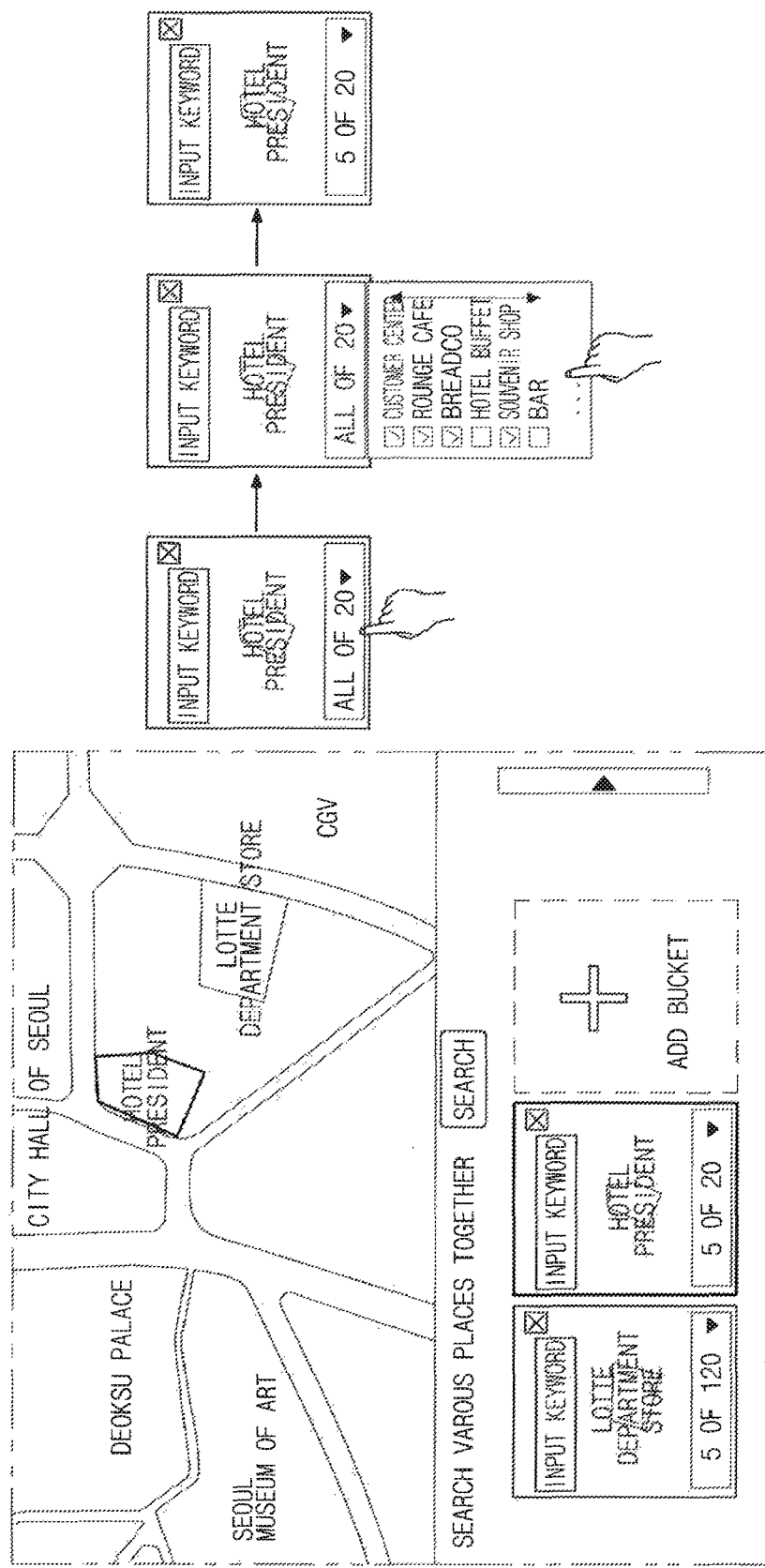

FIG. 8 is an exemplary block diagram illustrating a packed searching system according to another exemplary embodiment of the present invention. The object display unit 310, executed by a processor, may be configured to display SOI objects on a screen to distinguish SOI objects selected by a user from the other SOI objects. For example, after a user selects an SOI object to search for on the SOI map, when the object is dragged and dropped in a search box (e.g., bucket) in a search area, the object display unit 310 may be configured to change the color or shape of the selected SOI object on the map and display the shape of the selected SOI object in the search box. When a plurality of SOI objects are dropped in one search box, the object display unit 310 may be configured to display the plurality of SOI objects in the search box as piled-up (e.g., stacked) images of the objects or may display a list of the names of the objects. Further, when an SOI object is dragged and dropped in a search box, the object display unit 310 may be configured to transmit identification information of the selected SOI object (SOI ID) and information regarding the search box in which the SOI object is dropped to the search box creating unit 320 and to the object mapping unit 330, both executed by the processor. When the selected SOI object (e.g., higher-level SOI object) has lower-level SOI objects, information regarding the lower-level SOI objects may be transmitted together.

The search box creating unit 320 may be configured to create one or more search boxes to define SOI objects to be searched for in a search area, and transmit the information regarding the created search box (e.g., identification information) to the object mapping unit 330. The search box may be created as a keyword input box in which a search keyword may be input or as a bucket that includes an area in which the SOI object to be searched for may be dragged and dropped. In other words, in the exemplary embodiment, an SOI object may be selected as a search target when it is dropped in a bucket. The search box creating unit 320 may be configured to remove the bucket when a bucket delete button in the bucket is pressed. When a bucket add button on one side of the bucket is pressed, the search box creating unit 320 may be configured to create a new bucket next to the already created bucket. Further, when the SOI object dropped in the bucket has lower-level SOI objects, the search box creating unit 320 may be configured to provide on the lower end of the search box a list from which a user may check the lower-level SOI objects and may select objects to search for.

The object mapping unit 330, executed by the processor, may be configured to map the identification information of the selected SOI object to the identification information of a bucket (e.g., search box) in which the SOI object may be dropped. When the selected SOI object has lower-level SOI objects, the object mapping unit 330 may be configured to map the identification information on the lower-level SOI objects together. Further, when a plurality of SOI objects are dropped in one bucket, the object mapping unit 330 may be configured to map the SOI objects to the same bucket to search information regarding the plurality of SOI objects together, with an identical keyword input in the keyword box of the bucket.

When a search keyword is input in the keyword input box of the search box and a search button on a search area is pressed, the search result calculating unit 340, executed by the processor, may be configured to search information regarding the SOI objects dropped in the buckets (e.g., information regarding the space and information regarding content related to the space) for the information related to the keyword input in the keyword input box of the bucket. When a plurality of buckets are created in a search area and each of the buckets have a SOI object dropped therein, the search result calculating unit 340 may be configured to perform packaged searching on the plurality of SOI objects. Accordingly, the search result calculating unit 340 may be configured to search for related information from the plurality of SOI objects. In addition, when a plurality of SOI objects are dropped in the same bucket, the search result calculating unit 340 may be configured to perform packaged searching on the plurality of SOI objects dropped in the bucket, with an identical keyword input in the keyword input box of the bucket.

The search result output unit 350, executed by the processor, may be configured to display on a search area, the search result by the search result calculating unit 340 for each SOI object. The search result output unit 350 may be configured to display the search results in the search area as buckets sorted by SOI object (e.g., location) or may display the results as a list. When a user selects a bucket, the search result output unit 350 may be configured to display the selected bucket and information regarding the SOI objects dropped in the bucket. Further, when a recommendation information regarding an SOI object is provided, the search result output unit 350 may be configured to display the recommendation information on the SOI object on a map.

FIGS. 9A to 13B are exemplary views illustrating a packaged searching method according to another exemplary embodiment of the present invention. Detailed description on the searching method according to the exemplary embodiment will be made with reference to FIGS. 9A to 13B. In the above exemplary embodiment, when a user selects a search target (e.g., SOI object) on a map, search boxes and search results may be displayed on the map. In contrast, in this exemplary embodiment, as show in FIG. 9A, a search area may be configured separately from a map, and search boxes may be created and arranged as buckets to define search targets in a search area.

The search boxes may have a bucket shape that includes an area in which an SOI object to be searched for may be dropped and a keyword box in which a search keyword for the SOI object may be input. Initially, one bucket may be displayed in the search area, and a user may add or delete buckets based on user preference. For example, as shown in FIG. 9A, a bucket delete button may be disposed in the upper-right side of a bucket and a bucket add button may be disposed on the right side of the bucket, allowing a user to delete or add a bucket by pressing the buttons. Each of the buckets may include at least one SOI object. The SOI objects in the bucket may be search target of the search keyword input in the keyword input box of the bucket.

As shown in FIG. 9B, a user may select an SOI object to be searched for on a SOI map providing space object information, and then may drag the selected SOI object and drop the object in a bucket, to define the SOI object as the search target.

In particular, when a user selects an SOI object to be searched for and drags the selected SOI object and drops it in a bucket, the object display unit 310 may be configured to detect the drop and recognize which SOI object is dropped in which bucket, to change the color of the selected SOI object on the map. In the bucket, the image of the selected SOI object may be displayed. Additionally, the object display unit 310 may be configured to transmit to the search box creating unit 320 and to the object mapping unit 330 information regarding which SOI object is dropped in which bucket. When an SOI object is dropped in a bucket, the object mapping unit 330 may be configured to map the bucket (e.g., search box) to the SOI object(s) dropped in the bucket. When the SOI object(s) has lower-level SOI objects, the object mapping unit 330 may be configured to map the lower-level SOI objects together.

Further, when a user presses the bucket add button on the right side of the bucket to search for another SOI object, the search box creating unit 320 may be configured to create an additional bucket and display the new bucket on the right side of the existing bucket, as shown in FIG. 10A. A user may add a search target by selecting a desired SOI object on a map again and dragging the selected SOI object to drop it in a newly created bucket. Accordingly, the object mapping unit 330 may be configured to map the newly selected SOI object to the newly mated bucket (e.g., search box).

When the SOI object dropped in the bucket has lower-lever SOI objects, the search box creating unit 320 may be configured to display a list of the lower-level SOI objects from which a user may check and select the lower-level SOI objects at the lower end of the search box. For example, as shown in FIG. 10B, the a lower-level SOI list box may initially display the number of all the lower-level SOI objects and may display the list of names of the lower-level SOI objects when a user selects the list box. Thus, all of the lower-level SOI object or sonic of the lower-level SOI object may be searched by selectively checking check boxes. When a selected SOI object includes some of the lower-level SOI objects selected, as shown in FIG. 10A, the object display unit 310 may be configured to display the selected SOI object with all of the lower-level SOI objects selected and the selected SOI object with some of the lower-level SOI objects selected, with different colors. Further, the search box creating unit 320 may be configured to display information indicating the number of selected objects of the entire lower-level SOI objects on the lower-level SOI list box.

Figure 11:
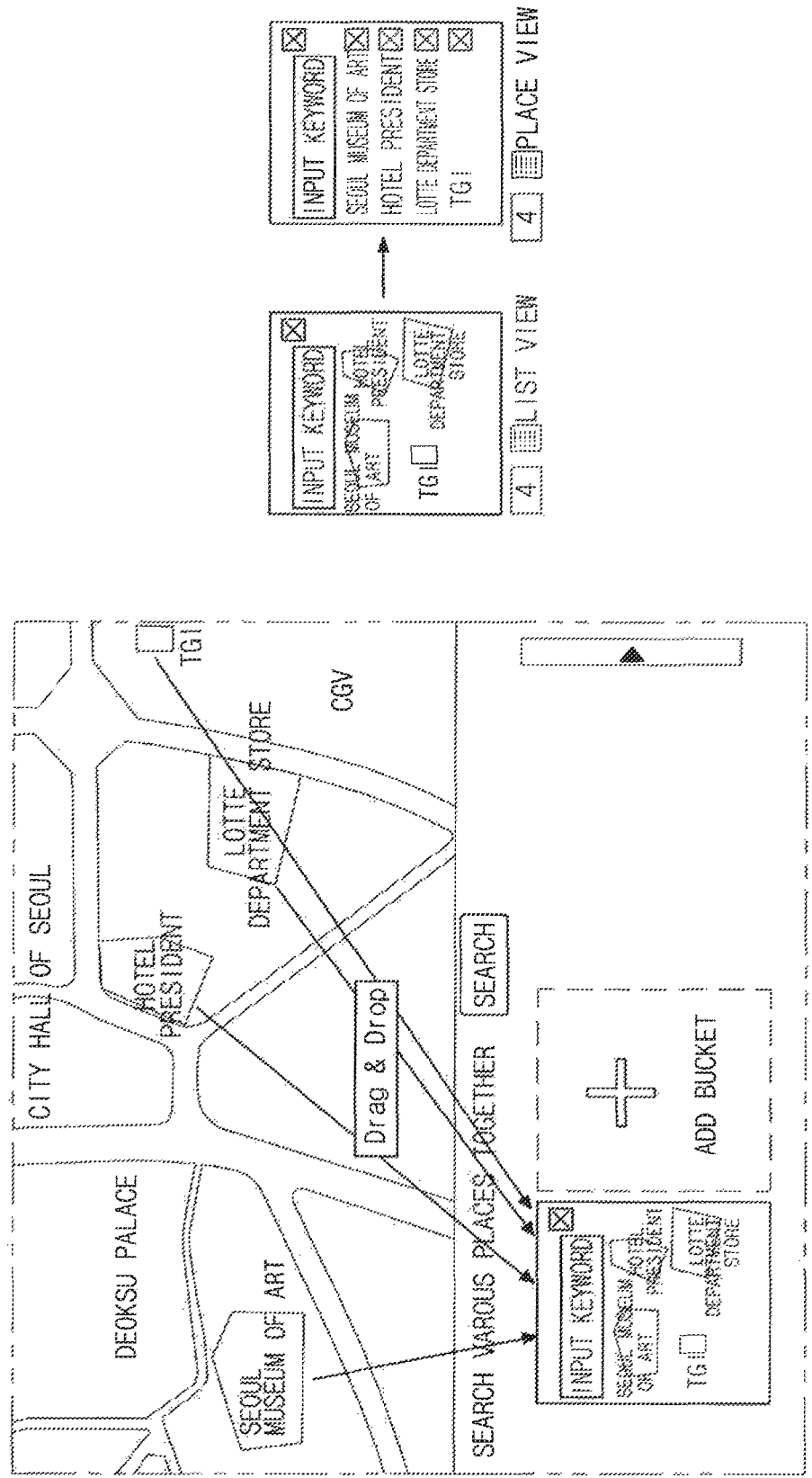

Although one SOI object may be dropped in one bucket in FIGS. 10A and 10B, a plurality of SOI objects may be dropped in the same bucket, as shown in FIG. 11. For example, to search different SOI objects with different keywords, one SOI object may be dropped in one bucket as shown in FIGS. 10A and 10B, and to search different SOI objects with the same keyword, a desired number of SOI objects may be dropped in the same bucket as shown in FIG. 11.

When a number of SOI objects are dropped in the same bucket (e.g., into one bucket), the object display unit 310 may be configured to display the dropped SOI objects as images (e.g., "place view") or may be configured to display them as text list (e.g., "list view"). An SOI object dropped in a. bucket may be deleted by dragging the image of SOI object and dropping it out of the bucket or by pressing a delete button ("x") next to the list. In addition, the object display unit 310 may be configured to display the number of the SOI objects dropped in a bucket on the lower end of the bucket.

As shown in FIGS. 10A and 10B or in FIG. 11, after SOI objects to be searched for are dropped in buckets and finally selected, when a search button on the upper end of a search area is selected, the search result calculating unit 340, executed by the processor, may be configured to search the information regarding the SOI objects in each of the buckets for the information related to a keyword input in a keyword input box of the bucket based on the mapping information of the object mapping unit 330.

Once the searching is completed, the search result output unit 350, executed by the processor, may be configured to display the search result for each SOI object on the search area and the map. For example, the search result output unit 350 may be configured to display the search result as buckets for each SOI object (e.g., each location) as shown in FIG. 12A or may be configured to display the 501 objects and the detailed information regarding the SOI objects as a list as shown in FIG. 12B. The place view or list view may be activated when a user selects between menus (e.g., "place view" and "list view") displayed on one side of the search area. The selected menu may be displayed with a different text color or font.

When a plurality of SOI objects are dropped in one bucket, that is, a plurality of SOI objects are searched for with the same search keyword, the objects may be displayed with the keyword. Therefore, the search result output unit 350 may be configured to display buckets that correspond to the SOI objects being stacked and display how many buckets (e.g., SOI objects) are stacked, as shown in FIG. 12A. Although not shown in the drawings, when a list is displayed as shown in FIG. 12B, the same keyword may be shared.

Furthermore, when recommendation information for SOI objects is provided, the search result output unit 350 may be configured to display the recommendation information on the SOI objects on the map. When a number of recommendation information items are provided, one information item may be displayed and the rest of the recommendation information items may be displayed. The search result display unit 350 may be configured to create a "close recommendation ink-inflation (X)" button or an "open recommendation information" button on the upper end of the map to display the content of the recommendation information based on user preference. Then, the search result output unit 350 may be configured to display the number of search result for each SOI object on the SOI objects on the map. In addition, the search result output unit 350 may be configured to move the buckets for the search result displayed on the search area by a drag-and-drop method, allowing a user to change the order in which the buckets are displayed.

Figures 13A, 13B:
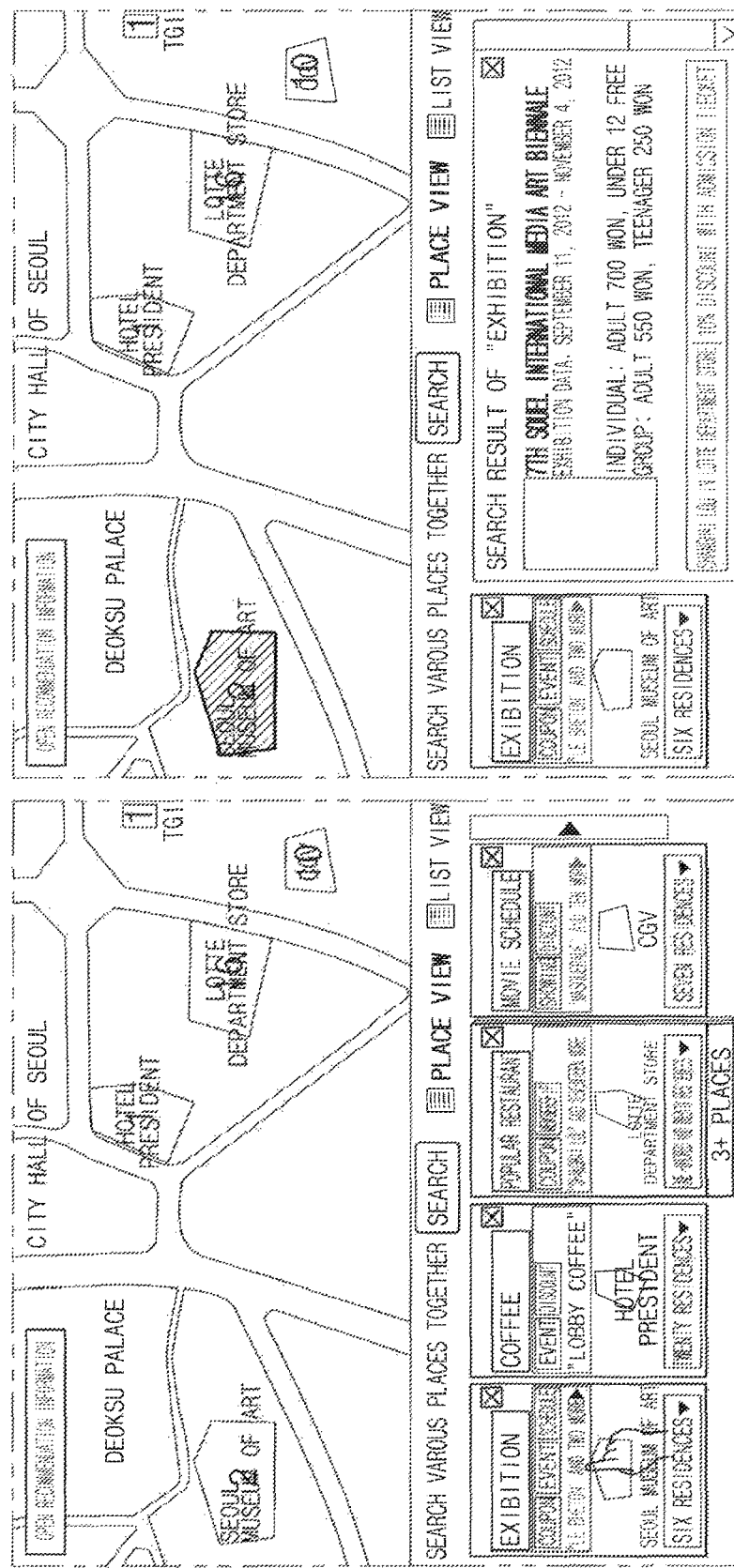

As shown in FIGS. 13A and 13B, when a bucket is selected from the buckets displayed on the search area, the search result output unit 350 may be configured to display information regarding the bucket on the search area. Further, the search result output unit 350, in cooperation with the object display unit 310, may be configured to display the displayed SOI object differently from the other SOI objects to distinguish the displayed SOI object from the other objects on the map. For example, the search result output unit 350 may be configured to change the color of the SOI object (as shown in the shaded area in FIG. 13B).

Moreover, for performing packaged searching on a plurality of SOI objects, when a user presses a bucket add button on the right side of an existing bucket, the search box creating unit 220 may be configured to create and display a new bucket on the right side of the existing bucket. According to exemplary embodiments of the present invention, searching may be performed on objects selected by a user; thus providing a user customized searching service. Further, packaged searching may be performed by mapping selected objects to keywords, and search results may be displayed in various manners.

The exemplary embodiments of the present invention described above have been provided for illustrative purposes. Therefore, those skilled in the art will appreciate that various modifications, alterations, substitutions, and additions are possible without departing from the scope and spirit of the invention as defined in the accompanying claims; and that such modifications, alterations, substitutions, and additions fall within the scope of the present invention.

Although the above exemplary embodiments have been described with respect to searching data with SOI objects, as will be appreciated by those skilled in the art, other than space objects such as SOI objects, the packaged searching using a plurality of keywords may be applied to searching an area on a map (e.g., two-dimensional area) or searching information regarding the area. In other words, the packaged searching that provides a search box for every object (e.g., a specific area or point such as POI object) selected by a user and uses a plurality of keywords as described above may be applied to a map service that provides information regarding a specific area or point on a map, as will be appreciated by those skilled in the art.

What is claimed is:

1. A packaged searching system, comprising:
a memory configured to store program instructions; and
a processor configured to execute the program instructions, the program instructions when executed configured to:
display a plurality of search target objects selected on a map to distinguish the plurality of search target objects from unselected objects;
create and display a plurality of search boxes on the map, wherein each of the plurality of search boxes correspond to the respective distinguished search target objects, and search keywords are independently input in each of the plurality of search boxes;
map the respective distinguished search target objects to each of the created search boxes;
search information regarding the respective distinguished search target objects mapped to the respective search boxes simultaneously using the independently inputted search keywords, wherein the information regarding the respective distinguished search target objects is searched within a space related to the search target objects, contents related to the search target objects, and information related to the selected search target objects; and
display the searched information for each of the plurality of search target objects, wherein
pieces of information among the searched information are displayed at separate positions on the map adjacent to the displayed plurality of search boxes for each of the plurality of search target objects, and
when the plurality of search target objects and the plurality of search boxes are configured as layers, the plurality of search boxes are mapped to the plurality of search target objects by invoking an interface disposed between the layers to transmit identifier information of the plurality of search target objects.

2. The packaged searching system according to claim 1, wherein the program instructions when executed are further configured to display the plurality of search boxes on the map to locate each of the search boxes on the respective search target objects.

3. The packaged searching system according to claim 1, wherein the program instructions when executed are further configured to create the plurality of search boxes in a layer different from a layer in which map information is displayed.

4. The packaged searching system according to claim 1, wherein the program instructions when executed are further configured to search for relation information between the plurality of search target objects with the searched information.

5. The packaged searching system according to claim 4, wherein the program instructions when executed are further configured to display the relation information on a search result display box for each search target object.

6. The packaged searching system according to claim 1, wherein the program instructions when executed are further configured to map the plurality of search boxes to the plurality of search target objects by assigning a value of each search box to member variables of the respective search target objects to base each search box on the respective search target objects.

7. The packaged searching system according to claim 1, wherein the program instructions when executed are further configured to map the plurality of search boxes to the plurality of search target objects by invoking a method between the plurality of search target objects or the plurality of search boxes to transmit identifier information.

8. The packaged searching system according to claim 1, wherein a search box of the plurality of search boxes is displayed adjacently to a corresponding selected search target object.

9. The packaged searching system according to claim 8, wherein the unselected objects are displayed on the map without a corresponding search box.

10. A packaged searching method, comprising:
selecting, by a processor, a plurality of search target objects on a map;
creating, by the processor, a plurality of search boxes for display on the map, wherein each created search box corresponds to a respective selected search target object, and search keywords are independently input in each search box;
performing, by the processor, packaged searching for information regarding the search target objects simultaneously using the independently inputted search keywords, wherein the information regarding the search target objects is searched within a space related to the search target objects, contents related to the search target objects, and information related to the selected search target objects; and displaying, by the processor, searched information for each selected search target on the map, wherein pieces of information among the searched information are displayed at separate positions on the map adjacent to the displayed plurality of search boxes for each of the plurality of search target objects, and when the plurality of search target objects and the plurality of search boxes are configured as layers, the plurality of search boxes are mapped to the plurality of search target objects by invoking an interface disposed between the layers to transmit identifier information of the plurality of search target objects.

11. The packaged searching method according to claim 10, wherein performing the packaged searching includes searching, by the processor, relation information between the plurality of search target objects.

12. The packaged searching method according to claim 10, wherein performing the packaged searching includes searching, by the processor, information regarding lower-level objects when the plurality of search target objects include lower-level objects.

13. The packaged searching method according to claim 10, wherein the plurality of search target objects are space of interest (SOI) objects displayed on a SOI map.

14. A non-transitory computer readable medium containing program instructions executed by a processor, the computer readable medium comprising:

program instructions that select plurality of search target objects on a map;

program instructions that create a plurality of search boxes for display on the map, wherein each created search box corresponds to a respective selected search target object, and search keywords are independently input in each search box;

program instructions that perform packaged searching for information regarding the search target objects simultaneously using the independently inputted search keywords, wherein the information regarding the search target objects is searched within a space related to the search target objects, contents related to the search target objects, and information related to the selected search target objects; and program instructions that display searched information for each selected search target on the map, wherein pieces of information among the searched information are displayed at separate positions on the map adjacent to the displayed plurality of search boxes for each of the plurality of search target objects, and when the plurality of search target objects and the plurality of search boxes are configured as layers, the plurality of search boxes are mapped to the plurality of search target objects by invoking an interface disposed between the layers to transmit identifier information of the plurality of search target objects.

15. The non-transitory computer readable medium of claim 14, wherein performing the packaged searching includes program instructions that search relation information between the plurality of search target objects.

16. The non-transitory computer readable medium of claim 14, wherein performing the packaged searching includes program instructions that search information regarding lower-level objects when the plurality of search target objects include lower-level objects.

* * * * *